Patented Mar. 2, 1926.

1,574,987

UNITED STATES PATENT OFFICE.

CARL MARX, OF WYOMING, MILBURN TOWNSHIP, ESSEX COUNTY, NEW JERSEY, ASSIGNOR TO UNION SULPHUR COMPANY, A CORPORATION OF NEW JERSEY.

METHOD OF PRODUCING PURIFIED SULPHUR.

No Drawing. Application filed December 19, 1922. Serial No. 607,897.

*To all whom it may concern:*

Be it known that I, CARL MARX, a citizen of the United States, residing in Wyoming, Milburn Township, Essex County, New Jersey, have invented a new and useful Method of Producing Purified Sulphur, of which the following is a specification.

The object of this patent application is the description of a process for the recovery of sulphur, both in the elemental form and in chemical combination, as, for example, sulphur contained in a mixture of sulphur and a sulphide.

Methods for the recovery of sulphur from ores containing the same, fall into three general classes. In those ores in which sulphur is contained in the elemental form, the same may be removed by vacuum distillation, as described by me in co-pending applications, by fusion or by extraction with solvents. Deposits of sulphur have been melted beneath the surface of the earth, and the sulphur forced to the surface while still in the liquid state.

Ores containing sulphur in chemical combination may be in the form of sulphides, sulphates, or other combinations of sulphur with elements. Many methods have been described for the recovery of sulphur from ores containing sulphides, but most of the processes have been found too expensive to operate. It has been known for some time that if iron pyrites, $FeS_2$, is heated in the absence of air, there will be formed sulphur and iron sulphide, $FeS$. This method was in use in Bohemia during the period 1863–1872 at the establishment of Starck (Ullmann, Enzyklopedie der Technischen Chemie, 1922, vol. 10, page 120), but abandoned due to the high fuel cost. Holloway (E. P. 500 and 1131 of 1878) heated with insufficient air, oxidizing the metal and obtaining sulphur. Frohlich, Flemming & Whitlock (E. P. 10295 of 1900; D. R. P. 127565) heat in an atmosphere of nitrogen or carbon dioxide, using sufficient oxygen to oxidize the iron to $Fe_2O_3$. Walter (D. R. P. 192578) distils the ore in a Herreshoff oven and gets sulphur. Wright (E. P. 26128, 1911) heats in an electric oven to 3000°. New Jersey Zinc Co. (U. S. P. 1103082, 1103083) distil pyrites in the absence of air and obtain sulphur. Hall (U. S. P. 1083248–1083253, 1133636) heats by a reducing flame in the presence of lime to 700°–900°, or with water vapor or steam. Other similar methods contemplate the use of sufficient oxygen only to oxidize the metallic elements to their oxides, with the elimination of sulphur. As the regulation of the admission of oxygen to the furnace is made only with difficulty, some of the sulphur is oxidized, and considerable quantities of sulphur usually remain in the ore. Furthermore, in those ores containing both elemental sulphur, and sulphur in chemical combination, often the excessive heat required to break the chemically combined sulphur in a form for economical utilization, at the same time partially destroys the sulphur originally present in the elemental form.

I have found that when certain ores containing sulphur in combination as sulphide, either with or without accompanying elemental sulphur, are treated according to the processes described in my co-pending applications, not only is the elemental sulphur contained therein removed with substantial completeness, but that a portion, or nearly all, of the sulphur in chemical combination may be caused to vaporize and subsequently recovered.

My method consists in heating ores containing sulphur, either with or without the presence of elemental sulphur therein, in an apparatus comprising still and receiver, and under a vacuum of from 25 to 30 inches, depending upon the nature of the product being operated upon and the amount of sulphur contained therein, a higher vacuum yielding sulphur at a lower temperature. While it is known that sulphur may be distilled from mixtures containing the same, the temperature required is excessive as the boiling point of sulphur is given as 444° C., which is over 100° C. above its ignition point. When working under reduced pressure by my process, however, or in a substantially absolute vacuum, the sulphur vaporizes at a much lower temperature, this temperature lowering with a lowering of the atmospheric pressure in the heating-condensing system, the temperature depending upon the degree of vacuum in the apparatus and the height of vapor rise in the still in which the sulphur-containing material is being treated. For example, with a still used by me, and having a vapor rise of 24 inches, sulphur will vaporize at about 334°

C. at only 26 inches of mercury column of vacuum, while if the vacuum is practically perfect, the sulphur will vaporize at below 260° C. If at the same time a small amount of a gas or vapor be admitted to the still in which the sulphur-containing material is being heated, such amount of gas or vapor being insufficient to materially lower the vacuum, then the sulphur will be condensed in the form of a fine, light-weight, highly colored, spherical or spheroidal powder, of neutral reaction, amorphous form and of very high purity.

The nature of the reactions occurring in the still will vary with the compound or compounds treated, and their relative composition and free or combined sulphur content. In the case of iron pyrites, the reaction follows the general lines of $FeS_2 = FeS+S$. Thus one-half of the chemically combined sulphur in the pyrites may be obtained, and if and where elemental sulphur is also present in the ore, this will obviously also distil over and may be condensed, by methods heretofore described by me. After treatment by my process, the chemically combined sulphur will be in a lower form of metallic sulphide, while the elemental sulphur will have been substantially removed. The residues may be worked up according to any desired method, or the sulphur completely recovered by treatment with such reagents that will cause a liberation of the sulphur as hydrogen sulphide or sulphur oxide. No claim is made to the recovery of sulphur from the ores by such processes.

The distillation operation may be so modified as to speed or heating and degree of absoluteness of vacuum maintained during heating, that a portion or all of the sulphur volatilized may be condensed as minute, spherical or spheroidal, amorphous particles of light weight, instead of liquid sulphur. Where the sulphur is collected in the receiver in the liquid state, the temperature of the receiver during operation is kept above the melting point of sulphur, and the latter therefrom, withdrawn periodically or at the close of the operation.

The residues in the still may be discharged mechanically, if desired, by being allowed to drop by gravity into another chamber still under vacuum, so that there is no necessity for interrupting the operation to remove sulphur from the system. The charging of the apparatus may also be performed in a similar manner where it is desired to work the process continuously.

Having now described my method of producing purified sulphur from sulphur in chemical combination, which I claim as new and desire to secure by Letters Patent is:—

1. A process for the treatment of ores containing volatilizable sulphur comprising distilling the ores under a high vacuum, passing the vapors into a vacuum receiver and condensing the products substantially as described.

2. A continuous process for the recovery of sulphur from ores by heat treatment comprising feeding ores into a still maintained under a high vacuum, heating the ores to generate gaseous sulphur, passing the sulphur vapors to a vacuum receiver connected with the still and condensing and removing the condensed sulphur, all without breaking the vacuum substantially as described.

3. A process for the recovery of sulphur from sulphide ores comprising distilling the sulphide ores under a high vacuum to liberate sulphur vapors and condensing such vapors.

This specification signed and witnessed this eighth day of December, 1922.

CARL MARX.